United States Patent
Mizobuchi et al.

(10) Patent No.: US 10,261,998 B2
(45) Date of Patent: Apr. 16, 2019

(54) SEARCH APPARATUS AND SEARCH METHOD

(71) Applicant: FUJITSU LIMITED, Kawasaki-shi, Kanagawa (JP)

(72) Inventors: Yuji Mizobuchi, Kawasaki (JP); Kuniharu Takayama, Tama (JP)

(73) Assignee: FUJITSU LIMITED, Kawasaki (JP)

(*) Notice: Subject to any disclaimer, the term of this patent is extended or adjusted under 35 U.S.C. 154(b) by 217 days.

(21) Appl. No.: 15/288,787

(22) Filed: Oct. 7, 2016

(65) Prior Publication Data
US 2017/0147569 A1    May 25, 2017

(30) Foreign Application Priority Data
Nov. 19, 2015 (JP) ................... 2015-226352

(51) Int. Cl.
G06F 17/30 (2006.01)
(52) U.S. Cl.
CPC .... G06F 17/30011 (2013.01); G06F 17/3053 (2013.01); G06F 17/30554 (2013.01)
(58) Field of Classification Search
CPC .......... G06F 17/30011; G06F 17/3053; G06F 17/30554
USPC ....................................................... 707/730
See application file for complete search history.

(56) References Cited

U.S. PATENT DOCUMENTS

| | | | | | |
|---|---|---|---|---|---|
| 5,970,489 | A | * | 10/1999 | Jacobson | G06F 17/30864 |
| 6,006,225 | A | * | 12/1999 | Bowman | G06F 17/30395 |
| 6,073,170 | A | * | 6/2000 | Sumita | G06F 17/30867 |
| | | | | | 707/999.01 |
| 6,516,312 | B1 | * | 2/2003 | Kraft | G06F 17/3061 |
| | | | | | 707/610 |
| 7,085,761 | B2 | * | 8/2006 | Shibata | G06F 17/30634 |
| 7,289,982 | B2 | * | 10/2007 | Saito | G06F 17/30616 |
| 7,343,371 | B2 | * | 3/2008 | Ibuki | G06F 17/3043 |
| 8,676,830 | B2 | * | 3/2014 | Mukherjee | G06F 17/30864 |
| | | | | | 707/768 |
| 9,811,584 | B2 | * | 11/2017 | Adachi | G06F 17/30675 |

(Continued)

FOREIGN PATENT DOCUMENTS

| | | |
|---|---|---|
| JP | 2003-58574 | 2/2003 |
| JP | 2004-246422 | 9/2004 |
| JP | 2009-238027 | 10/2009 |

OTHER PUBLICATIONS

Yao, Junjie, et al., "Keyword Query Reformulation on Structured Data", ICDE 2012, Washington, DC, Apr. 1-5, 2012, pp. 953-964.*

*Primary Examiner* — Robert Stevens
(74) *Attorney, Agent, or Firm* — Fujitsu Patent Center

(57) ABSTRACT

A control unit calculates a first document count indicating the number of documents that are retrieved based on a first keyword, a second document count indicating the number of documents that are retrieved based on a logical AND of the first keyword and a second keyword belonging to one item, and a third document count indicating the number of documents that are retrieved based on a logical AND of the first keyword and a third keyword belonging to the one item, from the set of documents. The control unit calculates an evaluation value of the one item, based on the first, second, and third document counts. When the evaluation value satisfies a predetermined condition, the control unit outputs recommendation information recommending use of the one item to narrow down documents that are retrieved.

6 Claims, 14 Drawing Sheets

(56) References Cited

U.S. PATENT DOCUMENTS

| | | | |
|---|---|---|---|
| 2003/0041058 A1* | 2/2003 | Ibuki | G06F 17/3043 |
| 2007/0050335 A1* | 3/2007 | Kashima | G06F 17/30864 |
| 2011/0082878 A1* | 4/2011 | Nozaki | G06F 17/3064 |
| | | | 707/769 |
| 2012/0005227 A1* | 1/2012 | Nagano | G06F 17/30702 |
| | | | 707/769 |
| 2012/0072220 A1* | 3/2012 | Zhang | G06F 17/3069 |
| | | | 704/251 |
| 2013/0275433 A1* | 10/2013 | Shibata | G06F 17/3071 |
| | | | 707/740 |
| 2015/0019566 A1* | 1/2015 | Jones | G06F 17/3064 |
| | | | 707/748 |

* cited by examiner

SEARCH APPARATUS

RECOMMENDED ITEM TABLE — 127

| Search Query | Recommended Item | Evaluation 1 (Average) | Evaluation 2 (Dispersion) |
|---|---|---|---|
| software:F-SQLDB | version | 277,500 | 5,303 |
| software:F-SQLDB | error | 299,250 | 176.7 |
| version:V6.0 | software | 70,000 | 0 |
| software:F-SQLDB, version:V6.0 | error | ... | ... |
| ⋮ | ⋮ | ⋮ | ⋮ |

FIG. 10

SEARCH APPARATUS AND SEARCH METHOD

CROSS-REFERENCE TO RELATED APPLICATION

This application is based upon and claims the benefit of priority of the prior Japanese Patent Application No. 2015-226352, filed on Nov. 19, 2015, the entire contents of which are incorporated herein by reference.

FIELD

The embodiments discussed herein are related to a search apparatus and a search method.

BACKGROUND

Search systems that search for documents matching a search condition entered by the user from a set of stored documents are widely used. In many search systems, the user enters one or more keywords as a search condition. A search condition including two or more keywords often indicates a search for the logical AND of the two or more keywords. For example, the search systems search for documents containing all of two or more entered keywords. By increasing the number of keywords that are entered as a search condition, it is possible to narrow down documents that are retrieved.

For the user of such search systems, it is preferable that documents (search noise) not containing desired information are removed from the search results so as to sufficiently narrow down documents that are retrieved. However, it is difficult for the user to specify a sufficient number of keywords needed to obtain the desired search results from the start. Thus, the user often starts with a small number of keywords, and adds keywords based on the search results to gradually narrow down the documents.

When adding a keyword as a search condition, the user might have only a vague idea of the desired information, and might not be able to think of appropriate keywords. Thus, some search systems provide a feature (suggestion feature) that presents keywords related to the entered keyword and useful to refine the search results. If the user determines that one or more of the presented keywords represent the desired information, the user may add the one or more keywords to the search condition. With this assistance by the search systems, it is possible to reduce the time taken to refine the search results.

There has been proposed a refinement condition extraction apparatus that presents keywords useful to refine the search results to the user. The proposed refinement condition extraction apparatus assigns a degree of recommendation to each of a plurality of keywords that are selected in advance by a search service provider. Further, for each of the plurality of keywords, the refinement condition extraction apparatus counts the number of documents containing the keyword, and calculates the effectiveness of refinement which is inversely proportional to the number of documents. The refinement condition extraction apparatus calculates, for each of the plurality of keywords, a comprehensive evaluation value based on the degree of recommendation and the effectiveness of refinement. The refinement condition extraction apparatus presents keywords having high comprehensive evaluation values to a mobile terminal apparatus.

There has also been proposed a search apparatus that improves the efficiency of narrowing down data to be retrieved from a relationship database. The proposed search apparatus extracts, for each of a plurality of items contained in a table, types of values registered in the item. Then, the search apparatus calculates, for each type of value, the count of records containing the type of value. The search apparatus displays, on a display, information associating the items of the table, the types of values, and the record counts with each other. The user specifies one of the items and one of the types of values as a search condition, based on the displayed record counts. Then, the search apparatus searches the table to retrieve records in which the specified type of value is registered in the specified item.

See, for example, Japanese Laid-open Patent Publications No. 2003-58574 and No. 2009-238027.

Keywords that may be used for searching for documents are sometimes classified into a plurality of items (types of keywords) based on their meanings. For example, documents related to an information processing system may contain items such as hardware name, software name, version number, error code, error message, and so on. The search results of the documents related to the information processing system may be refined using one or more of these items.

Among the plurality of items, there may be an item for which some work needs to be performed by the user. That is, the user does not know any specific keywords of the item to be entered when starting a search, and therefore needs to perform work such as inspection to find out the keywords. This type of use of a search system may be called a search involving work. In the search involving work, the user needs to perform work upon adding a keyword as a search condition.

For example, assume that a failure occurs to an information processing system, and the user attempts to find documents related to the failure. At the point when the user notices the failure, the user often does not know the name of hardware and the name of software installed in the information processing system, the version number, error codes output by the information processing system, error messages, and so on. Thus, in order to find out the hardware name, software name, version number, and so on related to the failure, the user may look at the settings information stored outside the information processing system, the settings file stored in the information processing system, and so on, for example. Further, in order to find out the error code, the error message, and so on related to the failure, the user may look at the log file stored in the information processing system, for example.

It is preferable that the amount of work by the user that is associated with refinement of the search results is small. Therefore, it is preferable that the user knows which of a plurality of items is useful for the refinement of the search results before performing work. The user may preferentially perform work for finding out keywords of an item that is useful for the refinement, and may skip work for finding out keywords of items that are not useful.

However, a suggestion feature provided by the refinement condition extraction apparatus and the search apparatus described above presents specific individual keywords. Even when a certain keyword belonging to a certain item is useful to refine the search results, other keywords belonging to the same item are not always useful. Therefore, only with the keyword suggestion feature, it is difficult to determine an item useful to refine the search results, and hence it is difficult to determine which work is to be preferentially performed. Thus, the improvement in the efficiency of the search involving work is mostly dependent on the knowledge and experience of the user, and sufficient assistance is not provided by the search system.

For example, assume that a specific error code is presented to the user by a keyword suggestion feature. In response to this presentation, the user may inspect the failed information processing system to find out the actual error code. However, the error code obtained from the inspection often does not match the presented specific error code. Further, there are cases in which the presented specific error code is not versatile and therefore is useful to refine the search results, but the error code found from the inspection is highly versatile and therefore is not useful to refine the search results. In such a case, even if the error code found from the inspection is added to the search condition, the search results might not be sufficiently refined, so that the inspection performed for finding out the error code might come to nothing.

SUMMARY

According to one aspect, there is provided a non-transitory computer-readable storage medium storing a computer program that causes a computer to perform a process including: calculating a first document count indicating a number of documents that are retrieved based on a first keyword, a second document count indicating a number of documents that are retrieved based on a logical AND of the first keyword and a second keyword belonging to one item of a plurality of items, and a third document count indicating a number of documents that are retrieved based on a logical AND of the first keyword and a third keyword belonging to the one item, among a set of documents stored in a storage device; calculating an evaluation value of the one item, based on the first document count, the second document count, and the third document count; and when the evaluation value satisfies a predetermined condition, outputting recommendation information recommending use of the one item of the plurality of items to narrow down documents that are retrieved.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of a recommended item table;

DESCRIPTION OF EMBODIMENTS

Figure 1:
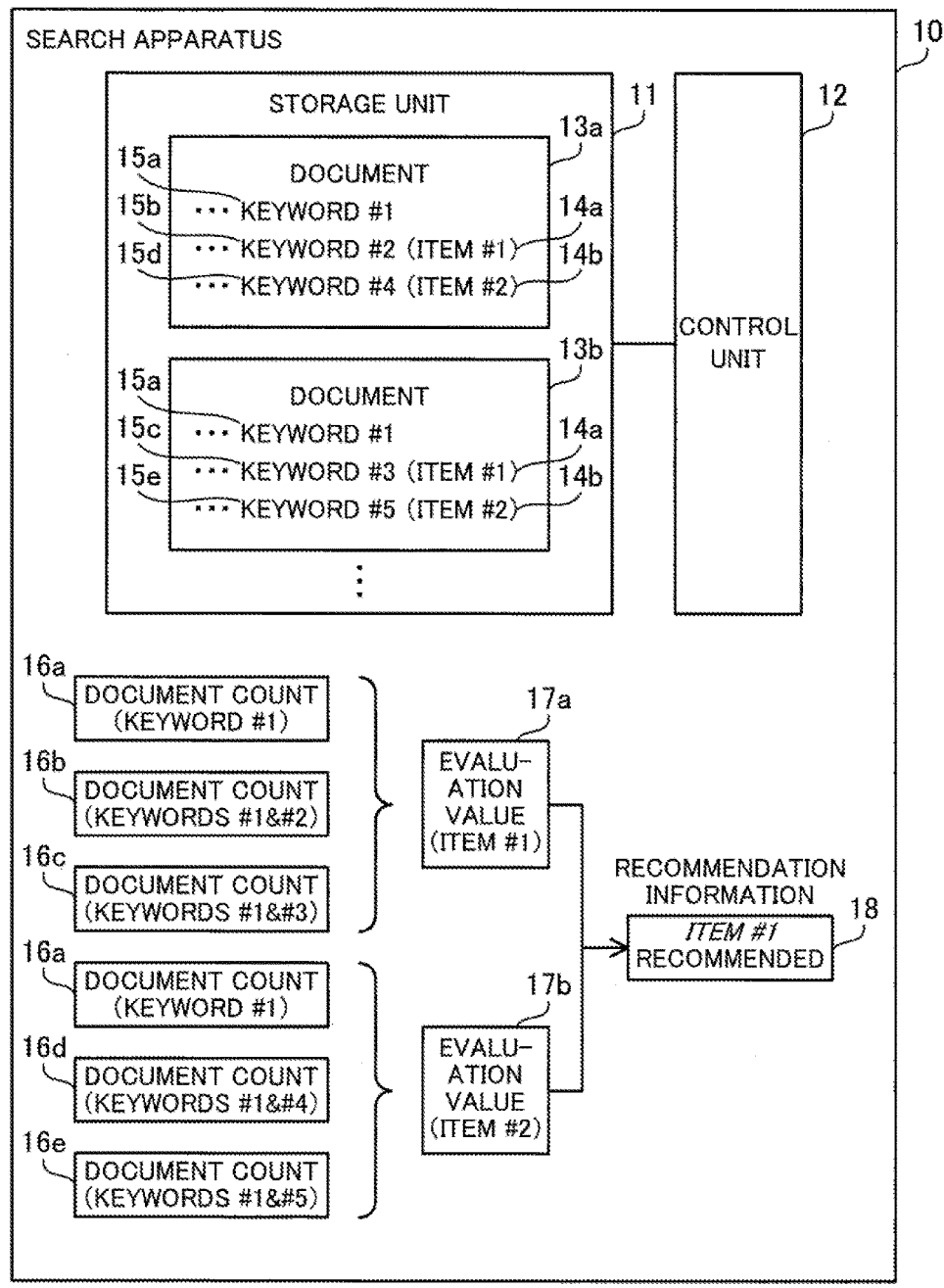
FIG. 1 illustrates an example of a search apparatus according to a first embodiment.

Several embodiments will be described below with reference to the accompanying drawings, wherein like reference numerals refer to like elements throughout.

(A) First Embodiment

The following describes a first embodiment.

FIG. 1 illustrates an example of a search apparatus according to a first embodiment.

A search apparatus 10 of the first embodiment receives a search request specifying one or more keywords, and searches for documents matching the specified keywords from a set of documents. A set of two or more keywords indicates the logical AND of the two or more keywords. For example, the search apparatus 10 searches for documents containing all the specified keywords. The search apparatus 10 outputs the search results in response to the search request. The search results include information on the retrieved one or more documents. The search results may include identification information of the retrieved documents, and may include links to the retrieved documents. Further, the search results may include part or all of the content of the retrieved documents, or may include the retrieved documents themselves.

A keyword included in a search request is entered by the user using an input device such as a keyboard or the like. The search results are output to an output device, and are displayed on a display, for example. The input device and the output device may be included in the search apparatus 10, or may be included in a terminal apparatus different from the search apparatus 10. In the latter case, the search apparatus 10 and the terminal apparatus are connected via a network. The search apparatus 10 may be a client apparatus such as a client computer and the like, or may be a server apparatus such as a server computer and the like.

The search apparatus 10 includes a storage unit 11 and a control unit 12.

The storage unit 11 stores a set of documents. The storage unit 11 is preferably a non-volatile storage such as a hard disk drive (HDD), a flash memory, and the like. However, the storage unit 11 may be a volatile semiconductor memory such as a random access memory (RAM) and the like. Although a set of documents is stored in the storage unit 11 in the first embodiment, the set of documents may be stored in a storage device provided outside the search apparatus 10.

The control unit 12 searches for documents matching a specified keyword from the set of documents in response to a search request, and outputs the search results. Further, the control unit 12 helps the user to select a keyword in the manner described below. The control unit 12 is a processor such as a central processing unit (CPU), a digital signal processor (DSP), and the like, for example. However, the control unit 12 may include an application specific electronic circuit such as an application specific integrated circuit (ASIC), a field programmable gate array (FPGA), and the like. The processor executes programs stored in a memory such as a RAM and the like (or the storage unit 11). The programs include a search program describing the procedure that will be described below. A set of multiple processors (a multiprocessor) may also be referred to as a "processor".

The set of documents stored in the storage unit includes documents 13a and 13b, for example. The document 13a contains a keyword 15a (first keyword). The document 13a also contains a keyword 15b (second keyword) belonging to an item 14a (first item). The document 13a also contains a keyword 15d (fourth keyword) belonging to an item 14b (second item). Similar to the document 13a, the document 13b contains the keyword 15a. The document 13b also contains a keyword 15c (third keyword) belonging to the item 14a. The document 13b also contains a keyword 15e (fifth keyword) belonging to the item 14b.

Each of the items 14a and 14b indicates the type or category of keywords, such as hardware name, software name, version number, error code, error message, and so on, for example. Each of the keywords 15b, 15c, 15d, and 15e is a specific character string, numeric value, symbol string, or the like related to one of the items. For example, if the item 14a indicates a category "software name", the keywords 15b and 15c are character strings each indicating a specific product name. Further, for example, if the item 14b indicates a category "version number", the keywords 15d and 15e are numeric values each indicating a specific version. Each document is described in accordance with a predetermined format in which items are associated with their values, for example.

In order to help the user to select a keyword, the control unit 12 calculates a document count 16a (first document count) indicating the number of documents that are retrieved based on the keyword 15a (for example, documents containing the keyword 15a). The control unit 12 also calculates a document count 16b (second document count) indicating the number of documents that are retrieved based on the logical AND of the keywords 15a and 15b (for example, documents containing both the keywords 15a and 15b). The control unit 12 also calculates a document count 16c (third document count) indicating the number of documents that are retrieved based on the logical AND of the keywords 15a and 15c (for example, documents containing both the keywords 15a and 15c). Each of the document counts 16b and 16c is less than the document count 16a. For calculating the document counts 16a, 16b, and 16c, the control unit 12 actually searches for matching documents, for example. If there is another keyword belonging to the item 14a, the control unit 12 may further calculate a document count indicating the number of documents that are retrieved based on the logical AND of the keyword 15a and the other keyword.

The control unit 12 calculates an evaluation value 17a of the item 14a, based on the calculated document counts 16a, 16b, and 16c. The evaluation value 17a represents a comprehensive evaluation of the entire set of keywords belonging to the item 14a, instead of an evaluation of each keyword belonging to the item 14a. The evaluation value 17a may be regarded as an expected value of the effect of refinement of the search results using the item 14a as a search condition. For example, the greater the evaluation value 17a is, the greater the refinement effect is expected to be, and the greater the reduction in the number of documents that are retrieved is expected to be.

There is often a difference in the actual effect of refinement of the search results even between keywords belonging to the same item. Thus, the control unit 12 obtains the average of the expected values of the refinement effects of the individual keywords as the evaluation value 17a. For example, the control unit 12 calculates the difference or the ratio between the document count 16a and the document count 16b, and calculates the difference or the ratio between the document count 16a and the document count 16c. The control unit 12 calculates the average of the calculated differences or ratios as the evaluation value 17a, for example. Note that the smaller the dispersion of the calculated differences or ratios is, the higher the reliability of the evaluation value 17a is. Accordingly, the control unit 12 may reflect the dispersion of the calculated differences or ratios to the evaluation value 17a.

Similarly, the control unit 12 calculates a document count 16d (fourth document count) indicating the number of documents that are retrieved based on the logical AND of the keywords 15a and 15d (for example, documents containing both the keywords 15a and 15d). The control unit 12 also calculates a document count 16e (fifth document count) indicating the number of documents that are retrieved based on the logical AND of the keywords 15a and 15e (for example, documents containing both the keywords 15a and 15e). Then, the control unit 12 calculates an evaluation value 17b of the item 14b, based on the calculated document counts 16a, 16d, and 16e. For example, the control unit 12 calculates the difference or the ratio between the document count 16a and the document count 16d, calculates the difference or the ratio between the document count 16a and the document count 16e, and calculates the average of the calculated differences or ratios as the evaluation value 17b.

The control unit 12 generates and outputs recommendation information 18, based on the evaluation values 17a and 17b. The recommendation information 18 is displayed on a display of the terminal apparatus operated by the user, for example. The recommendation information 18 indicates one item (recommended item) of a plurality of items that is useful to refine the search results. For example, the recommendation information 18 indicates an item whose calculated evaluation value is high. When the evaluation value 17a satisfies a predetermined condition, the recommendation information 18 indicates that the item 14a is a recommended item. The predetermined condition may be that the evaluation value 17a is greater than a threshold. Alternatively, the predetermined condition may be that the evaluation value 17a is greater than the evaluation value of another item. There may be two or more recommended items. In this case, the two or more recommended items may be prioritized in descending order of the calculated evaluation value.

Note that the search apparatus 10 may calculate the evaluation values 17a and 17b in advance before receiving a search request, or may calculate the evaluation values 17a and 17b after receiving a search request specifying the keyword 15a. Further, the search apparatus 10 may output the recommendation information 18 after receiving the search request specifying the keyword 15a. The recommendation information 18 may be output together with the search results corresponding to the search request specifying the keyword 15a, or may be output separately from the search results (for example, before outputting the search results).

According to the search apparatus 10 of the first embodiment, the document count 16a indicating the number of documents matching the keyword 15a, the document count 16b indicating the number of documents matching the logical AND of the keywords 15a and 15b, and the document count 16c indicating the number of documents matching the logical AND of the keywords 15a and 15c are calculated. Then, the evaluation value 17a of the item 14a is calculated based on the document counts 16a, 16b, and 16c. Then, when the evaluation value 17a satisfies a predetermined condition, the recommendation information 18 is output that recommends use of the item 14a to narrow down documents that are retrieved. Thus, the search results may be efficiently refined when the user inputs a keyword belonging to the item 14a indicated in the recommendation information 18. Accordingly, even in the case where work such as an inspection and the like is needed so as to determine a keyword to be entered, it is possible to efficiently refine the search results.

That is, in the case where the user does not know about a certain item, the user needs to perform work such as checking files, posing questions to those involved, and so on, in order to know about the item. However, there may be a variety of keywords belonging to the item. Even if a specific keyword belonging to the item is useful to refine the search results, another keyword obtained by the work is not always useful to refine the search results. Accordingly, the work performed to obtain a keyword to be entered might come to nothing. On the other hand, the search apparatus 10 evaluates the average usefulness of an item, instead of the usefulness of each keyword. Thus, the search apparatus 10 presents a recommended item that is likely to be useful to refine the search results. This makes it possible to reduce the risk of the work performed by the user coming to nothing, and to reduce the time taken to refine the search results.

(B) Second Embodiment

The following describes a second embodiment.

Figure 2:
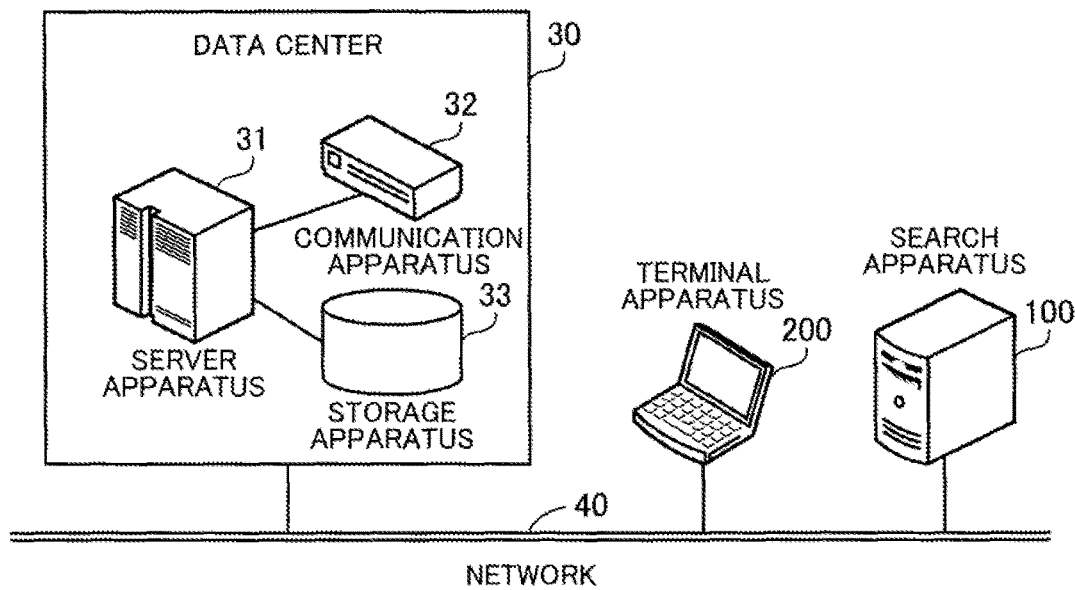
FIG. 2 illustrates an example of an information processing system according to a second embodiment.

FIG. 2 illustrates an example of an information processing system according to the second embodiment.

The information processing system of the second embodiment includes a data center 30, a search apparatus 100, and a terminal apparatus 200. The data center 30, the search apparatus 100, and the terminal apparatus 200 are connected through a network 40. The network 40 may include a local area network (LAN), and a wide area network such as the Internet and the like. The search apparatus 100 and the terminal apparatus 200 may be located close to each other, or may be located away from each other. Further, one of or both the search apparatus 100 and the terminal apparatus 200 may be located inside or close to the data center 30, or may be located away from the data center 30.

The data center 30 provides a service that allows the customer to use the hardware and software of an information communication apparatus. The data center 30 includes various types of information communication apparatuses, such as a plurality of server apparatuses including a server apparatus 31, a plurality of communication apparatuses including a communication apparatus 32, a plurality of storage apparatuses including a storage apparatus 33, and so on. The server apparatus 31 is a server computer that executes software. The communication apparatus 32 is a network device that connects server apparatuses, such as switches, routers, and so on, to each other. The storage apparatus 33 stores programs and data.

In the data center 30, an incident may occur. The term "incident" as used herein refers to a state or a phenomenon in which the user is unable to successfully perform an operation that is supposed to be available to the user through the data center 30. Examples of incidents include a failure of an information communication apparatus. The incident may be caused by various factors including hardware failure, setting error, program error, disaster, failure in environment control such as temperature control, and the like. When an incident occurs, the data center 30 reports the occurrence of the incident to the terminal apparatus 200.

The search apparatus 100 is a server computer that manages documents of incident response reports. An incident response report describes information indicating an incident that occurred previously, and information indicating actions taken to solve the incident. An incident response report is created for each incident, and the document of the incident response report is registered in the search apparatus 100. Each document is stored as, for example, one file in the storage device. Further, the search apparatus 100 receives a search query from the terminal apparatus 200, and searches for matching documents from the stored documents in accordance with the received search query. More specifically, the search apparatus 100 searches for documents containing all the keywords specified in the search query. The search apparatus 100 transmits the search results indicating the retrieved documents to the terminal apparatus 200.

The terminal apparatus 200 is a client computer used by the operations manager of the data center 30. When an incident occurs, the terminal apparatus 200 receives an incident report from the data center 30. Then, the operations manager performs incident response work to solve the incident. In the incident response work, the operations manager collects various types of information related to the incident from the data center 30 by using the terminal apparatus 200. For example, the terminal apparatus 200 transmits a command to the data center 30. Note that the operations manager or an authorized person may go to the data center 30 to perform work at the site. Further, the operations manager searches for and obtains documents related to previous incidents similar to the current incident from the search apparatus 100, by using the terminal apparatus 200. For example, the terminal apparatus 200 transmits a search query specifying one or two keywords to the search apparatus 100.

The operations manager determines actions to be taken based on the information collected from the data center 30 and the documents of previous incident response reports obtained from the search apparatus 100, and performs work to solve the incident. When the incident is solved, the operations manager creates an incident response report about the current incident, and registers the document of the report in the search apparatus 100.

Figure 3:
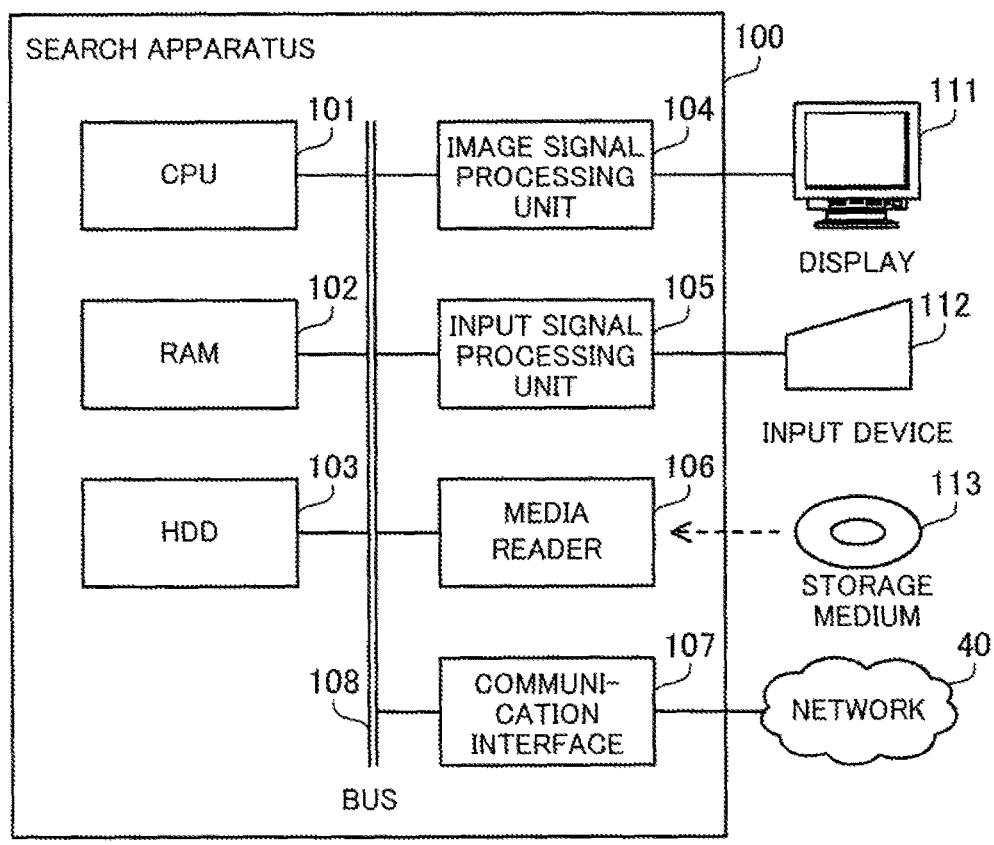
FIG. 3 is a block diagram illustrating an example of hardware of a search apparatus.

FIG. 3 is a block diagram illustrating an example of hardware of the search apparatus 100.

The search apparatus 100 includes a CPU 101, a RAM 102, an HDD 103, an image signal processing unit 104, an input signal processing unit 105, a media reader 106, and a communication interface 107. The CPU 101, the RAM 102, the HDD 103, the image signal processing unit 104, the input signal processing unit 105, the media reader 106, and the communication interface 107 are connected to a bus 108. The search apparatus 100 corresponds to the search apparatus 10 of the first embodiment. The CPU 101 corresponds to the control unit 12 of the first embodiment. The RAM 102 and the HDD 103 correspond to the storage unit 11 of the first embodiment. The terminal apparatus 200 may be implemented by the same hardware as that of the search apparatus 100.

The CPU 101 is a processor including an arithmetic circuit that executes program instructions. The CPU 101 loads at least part of a program and data stored in the HDD 103 to the RAM 102, and executes the program. Note that the CPU 101 may include multiple processor cores, and the search apparatus 100 may include multiple processors. Thus, processes described below may be executed in parallel by using multiple processors or processor cores. A set of multiple processors (a multiprocessor) may be referred to as a "processor".

The RAM 102 is a volatile semiconductor memory that temporarily stores a program executed by the CPU 101 and data used for operations by the CPU 101. The search apparatus 100 may include other types of memories than a RAM, and may include a plurality of memories.

The HDD 103 is a non-volatile storage device that stores software programs (such as an operation system (OS), middleware, application software, and the like) and data. The programs include a search program. The search apparatus 100 may include other types of storage devices such as a flash memory, an SSD, and the like, and may include a plurality of non-volatile storage devices.

The image signal processing unit 104 outputs an image to a display 111 connected to the search apparatus 100, in accordance with an instruction from the CPU 101. Examples of the display 111 include a cathode ray tube (CRT) display, a liquid crystal display (LCD), a plasma display, an organic electro-luminescence (OEL) display, and the like.

The input signal processing unit 105 obtains an input signal from an input device 112 connected to the search apparatus 100, and outputs the input signal to the CPU 101. Examples of the input device 112 include a pointing device (such as a mouse, a touch panel, a touch pad, a trackball, and the like), a keyboard, a remote controller, a button switch, and the like. A plurality of types of input devices may be connected to the search apparatus 100.

The media reader 106 is a reading device that reads a program and data stored in a storage medium 113. Examples of the storage medium 113 include a magnetic disc (such as a flexible disk (FD), an HDD, and the like), an optical disc (such as a compact disc (CD), a digital versatile disc (DVD), and the like), a magneto-optical disc (MO), a semiconductor memory, and the like. The media reader 106 reads, for example, a program and data from the storage medium 113, and stores the read program and data in the RAM 102 or the HDD 103.

The communication interface 107 is connected to the network 40, and communicates with other apparatuses such as the terminal apparatus 200 via the network 40. The communication interface 107 may be a wired communication interface connected to a communication apparatus such as a switch via a cable, or may be a radio communication interface connected to a base station via a radio link.

Figure 4:
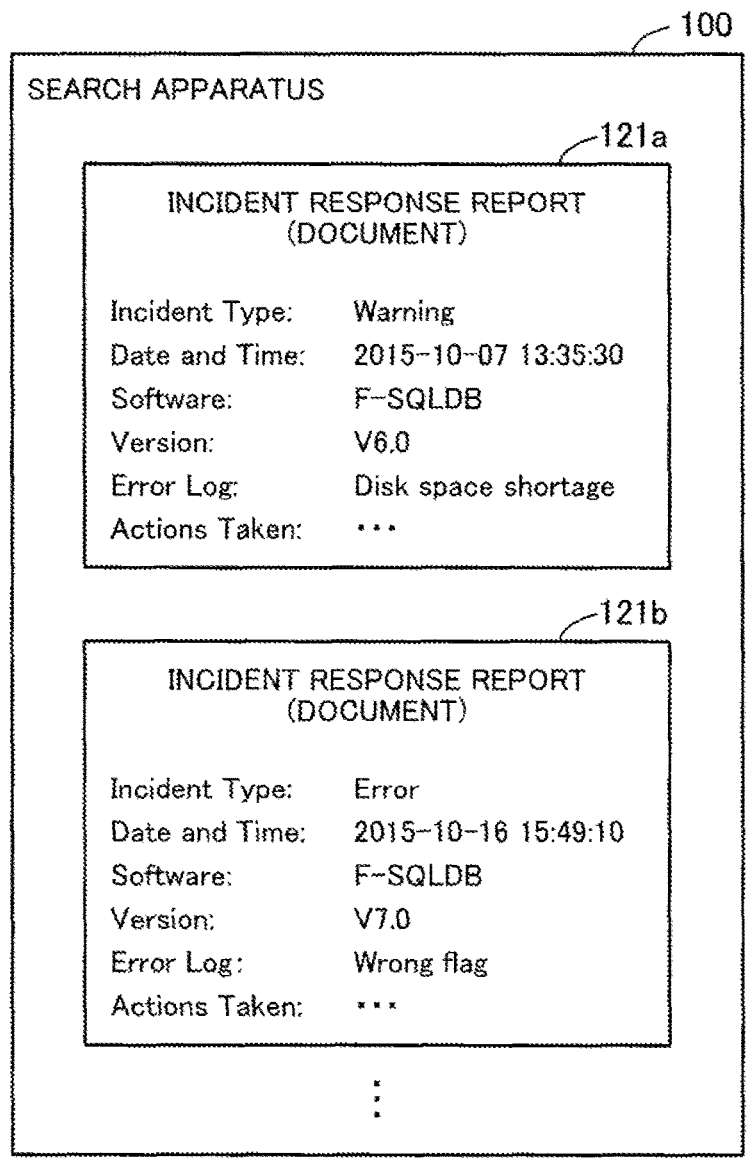
FIG. 4 illustrates an example of stored documents.

FIG. 4 illustrates an example of stored documents.

The search apparatus 100 stores a plurality of documents including documents 121a and 121b. Each document is an incident response report about one incident. Each document is described in accordance with a predetermined format in which items are associated with their values.

Each document includes the following items: Incident Type, Date and Time of Occurrence, Software, Version, Error Log, and Actions Taken. The item "Incident Type" indicates the level of importance of the incident. The item "Date and Time of Occurrence" indicates when the date center 30 reported the incident to the terminal apparatus 200. The item "Software" indicates the product name of the software that caused the incident. Types of software include OS, database management software, Web server software, and so on. The item "Version" indicates the version name of the software. The item "Error Log" indicates an error message output to a log file. The item "Actions Taken" indicates work performed to solve the incident. When a similar incident occurs later, the actions may be referred to in order to solve the incident.

In the document 121a, "Incident Type" is "Warning"; "Date and Time of Occurrence" is "2015-10-07 13:35:30"; "Software" is "F-SQLDB"; "Version" is "V6.0"; and "Error Log" is "Disk space shortage". In the document 121b, "Incident Type" is "Error"; "Date and Time of Occurrence" is "2015-10-16 15:49:10"; "Software" is "F-SQLDB"; "Version" is "V7.0"; and "Error Log" is "Wrong flag".

Figure 5:
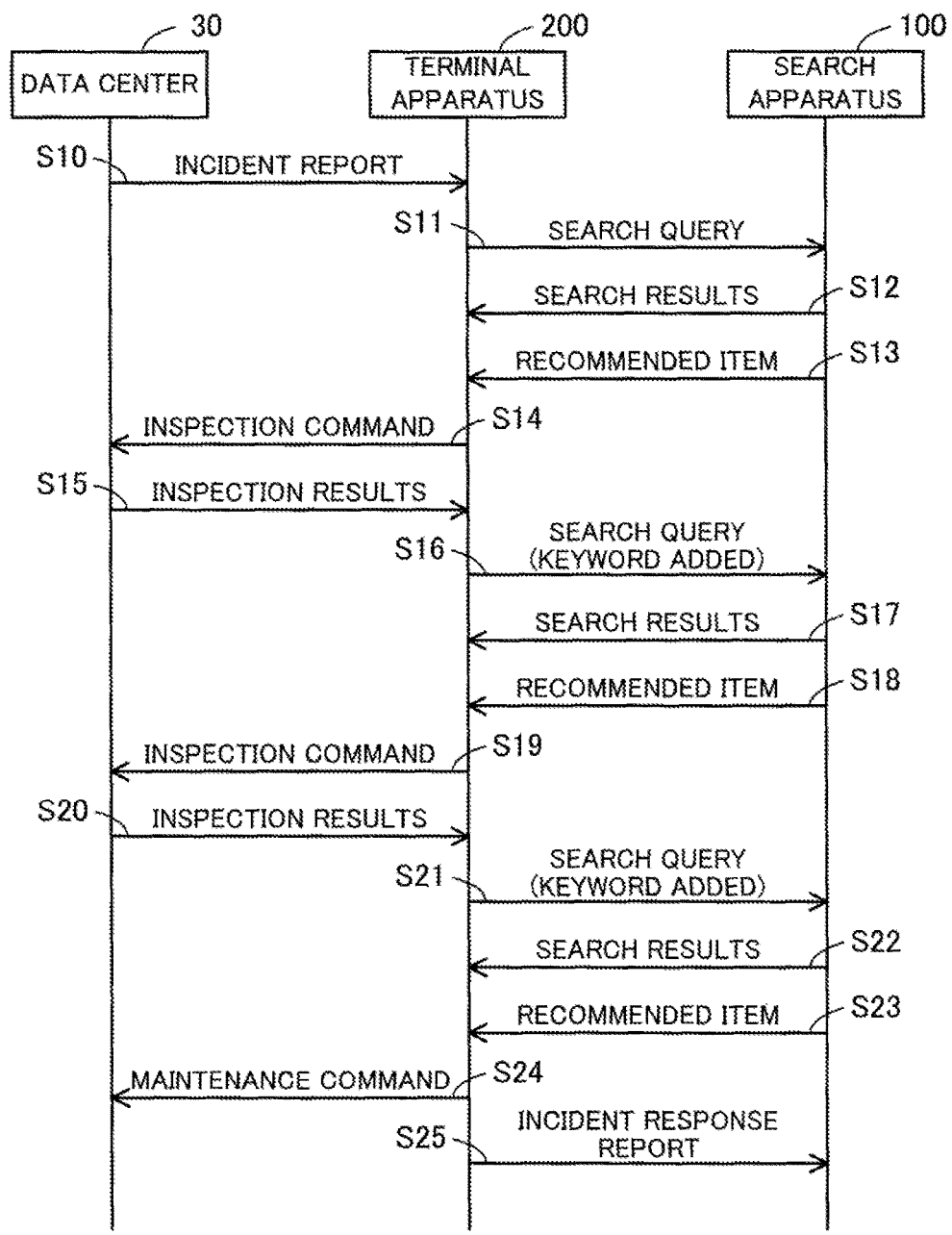
FIG. 5 is a sequence diagram illustrating an example of communication between the search apparatus and a terminal apparatus.

FIG. 5 is a sequence diagram illustrating an example of communication between the search apparatus 100 and the terminal apparatus 200.

When an incident occurs, an incident report is transmitted from one of the information communication apparatuses (for example, the server apparatus 31) in the data center 30 to the terminal apparatus 200 (S10). The incident report itself does not include enough information to analyze the incident.

The terminal apparatus 200 obtains one or two keywords entered by the operations manager, generates a search query including the obtained keywords, and transmits the search query to the search apparatus 100 (S11). Upon receiving the search query from the terminal apparatus 200, the search apparatus 100 searches for documents by using the keywords specified in the search query as a search condition, and transmits the search results to the terminal apparatus 200 (S12). Usually, the search apparatus 100 searches for documents containing all the specified keywords. The search results include a list of information on the retrieved documents. The information on the retrieved documents may include bibliographic information about the documents and links to the documents. Further, the information on the retrieved documents may include part or all of the content of the retrieved documents.

The search apparatus 100 determines, from a plurality of items defined in the document of the incident response report, a recommended item that is useful to further refine the search results (to narrow down or reduce the number of documents that are retrieved), based on the keywords specified in the search query. The search apparatus 100 transmits information indicating the recommended item to the terminal apparatus 200 (S13). Note that the search apparatus 100 may transmit the information on the recommended item before transmitting the search results, or may transmit the information on the recommended item together with the search results. Alternatively, the search apparatus 100 may transmit only the information on the recommended item first, without immediately searching for documents matching the received search query.

Upon receiving the search results and the information on the recommended item from the search apparatus 100, the terminal apparatus 200 displays the search results and the recommended item on the display. If the operations manager determines that there are too many retrieved documents, the operations manager enters an additional keyword belonging to the recommended item to attempt to refine the search results. However, the operations manager has not fully checked the situation in which the incident occurred or analyzed the cause, and therefore may have no idea which keyword to enter.

Thus, for example, the terminal apparatus 200 transmits an inspection command to the information communication apparatus (for example, the server apparatus 31) of the data center 30, based on an input by the operations manager (S14). The inspection command may be a command for reading the configuration file and the log file stored in the information communication apparatus. Alternatively, the inspection command may be a command for collecting information on the hardware usage such as CPU usage, RAM usage, and so on, or may be a command for collecting information on the software running status such as a process list. The terminal apparatus 200 receives the inspection results for the inspection command from the data center 30 (S15). The inspection may be performed only on those related to the recommended item, and does not have to be performed on those not related to the recommended item.

Based on the inspection results, the operations manager finds out a keyword of the recommended item to be added as a search condition. The terminal apparatus 200 obtains the keyword added by the operations manager, generates a search query including the previously entered keywords and the added keyword, and transmits the search query to the search apparatus 100 (S16). The search apparatus 100 transmits the search results for the new search query to the terminal apparatus 200 (S17). Then, the search apparatus 100 determines an additional recommended item useful to further refine the search results, based on the keywords specified in the new search query, and transmits information indicating the additional recommended item to the terminal apparatus 200 (S18).

If the operations manager determines that there are still too many retrieved documents, the operations manager enters an additional keyword belonging to the additional recommended item to attempt to refine the search results. If the operations manager does not know which keyword to enter due to insufficient inspection, the terminal apparatus 200 transmits an additional inspection command to the information communication apparatus of the data center 30 (S19), and receives additional inspection results for the inspection command from the data center 30 (S20).

Based on the additional inspection results, the operations manager finds out a keyword of the additional recommended item to be added. The terminal apparatus 200 obtains the keyword added by the operations manager, generates a search query including the previously entered keywords and the added keyword, and transmits the search query to the search apparatus 100 (S21). The search apparatus 100 transmits the search results for the new search query to the terminal apparatus 200 (S22). Then, the search apparatus 100 determines an additional recommended item useful to further refine the search results, based on the keywords specified in the new search query, and transmits information indicating the additional recommended item to the terminal apparatus 200 (S23).

If the operations manager determines that an appropriate number of documents are retrieved, the operations manager obtains at least one of the documents presented as the search results from the search apparatus 100 and looks at the document. Then, the operations manager determines work to be performed to solve the incident, based on the previously taken actions described in the document. For example, the terminal apparatus 200 transmits a maintenance command to the information communication apparatus (for example, the server apparatus 31) of the data center 30, based on an input by the operations manager (S24). The maintenance command may be a command for rewriting the configuration file, or may be a command for force-quitting one or more of processes and preventing the processes from restarting.

The operations manager creates an incident response report about the current incident by using the terminal apparatus 200. The terminal apparatus 200 transmits the document of the incident response report to the search apparatus 100 (S25). The search apparatus 100 stores the received document.

The following describes processing performed by the search apparatus 100 to present a recommended item. The processing to generate a recommended item table described below is performed in advance before receiving a search query. For example, the search apparatus 100 periodically updates the recommended item table.

Figure 6:
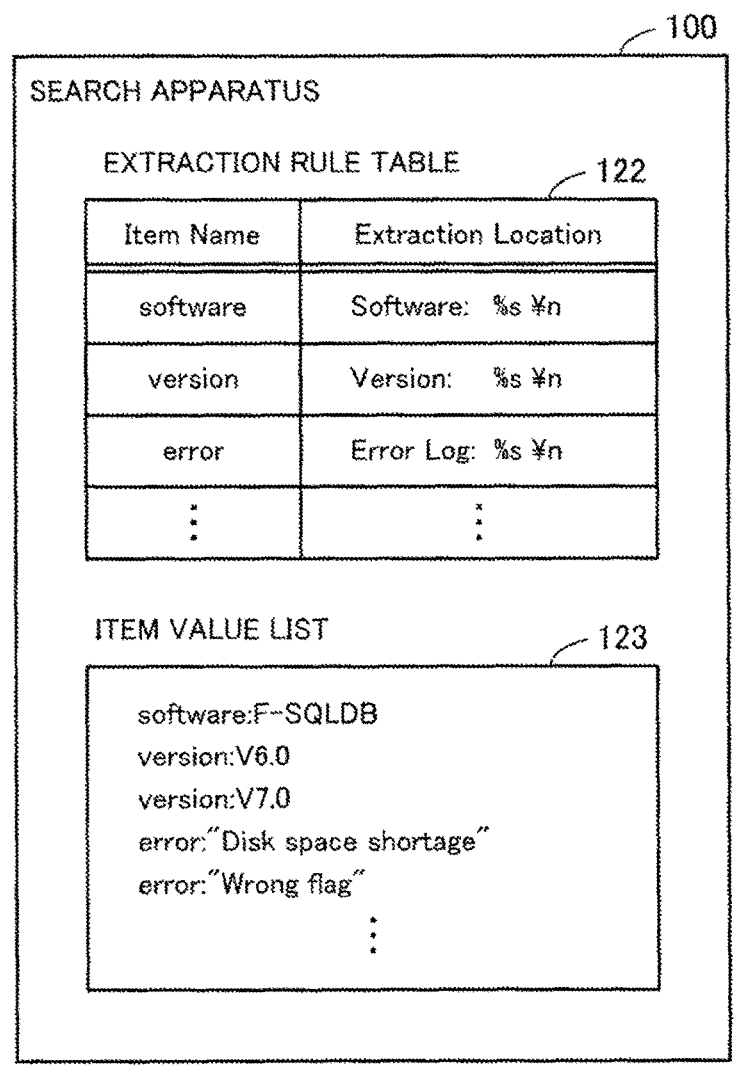
FIG. 6 illustrates an example of an extraction rule table and an item value list.

FIG. 6 illustrates an example of an extraction rule table and an item value list.

The search apparatus 100 stores an extraction rule table 122. The extraction rule table 122 is used to extract a pair of an item and its value from a document, and is created in advance based on a format of an incident response report.

The extraction rule table 122 includes the following fields: Item Name and Extraction Location. The Item Name field stores the name for identifying an item. The item name used for presenting a recommended item may be the same as, or may be different from the name written in the document. In the second embodiment, the item name "software" is used for identifying the item "Software", the item name "version" is used for identifying the item "Version"; and the item name "error" is used for identifying the item "Error Log". The Extraction Location field stores information indicating a location in the document where the value of the item is written. The value of "Software" is written between "Software:" and a newline. The value of "Version" is written between "Version:" and a newline. The value of "Error Log" is written between "Error Log:" and a newline.

Note that the format of the incident response report may be a strict format, or may be a loose format (a so-called free format). In the example of an incident response report of FIG. 4, each line corresponds to one item, and describes the name of the item, followed by the value of the item. The name of the item is determined in advance. In this regard, the example of an incident response report of FIG. 4 is described in accordance with a relatively strict format. In the case where the incident response report is described in accordance with a loose format, an extraction rule table 122 corresponding to that format is prepared. Regular expressions may be used for defining the extraction location. Further, strings within a predetermined range from the name of an item may be specified as a search range of the value of the item.

The search apparatus 100 generates an item value list 123 based on the stored documents and the extraction rule table 122, and stores the item value list 123. The item value list 123 includes a list of pairs of an item name and a value. The search apparatus 100 extracts pairs of an item name and a value from all the stored documents, in accordance with the extraction rule table 122. The item value list 123 includes all the extracted pairs of an item name and a value. However, the item value list 123 does not have to include the same pair of an item name and a value more than once. Each line in the item value list 123 indicates one pair of an item name and a value.

For example, the item value list 123 includes "software: F-SQLDB", "version:V6.0", "version:V7.0", "error:"Disk space shortage"", and "error:"Wrong flag"".

Figure 7:
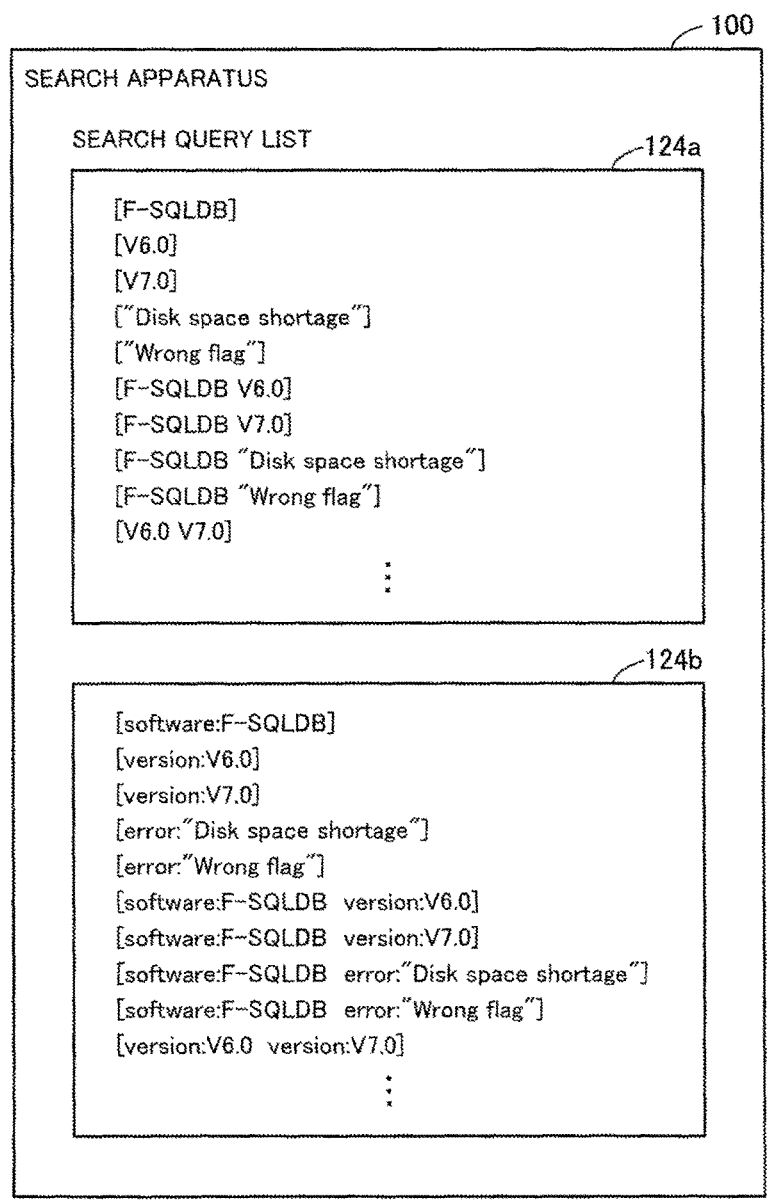
FIG. 7 illustrates an example of search query lists.

FIG. 7 illustrates an example of search query lists.

The search apparatus 100 generates a search query list 124a or a search query list 124b, based on the item value list 123, and stores the search query list 124a or the search query list 124b. Each of the search query lists 124a and 124b includes a list of search queries. The search apparatus 100 selects one or more item values from the item value list 123, and generates a search query including the selected item values. Each of the search query lists 124a and 124b includes search queries for all the possible combinations of the keywords. If the item value list 123 has N (N is an integer equal to or greater than 2) item values, $2^N-1$ search queries are generated.

Which of the search query list 124a and the search query list 124b is generated is dependent on the search engine used by the search apparatus 100. If it is not possible to specify the name of the item to which a keyword belongs in a search query, the search query list 124a is generated. If it is possible to specify the name of the item to which a keyword belongs in a search query, the search query list 124b is generated.

A search query of the search query list 124b searches for documents containing a specified keyword in a specified item. On the other hand, a search query of the search query list 124a searches for documents containing a specified keyword irrespective of the item. For example, there is a document in which "F-SQLDB" is indicated in the item "Error Log". Then, if "F-SQLDB" is specified as a keyword without specifying the item, the search results include this document. On the other hand, if "software" is specified as the item and "F-SQLDB" is specified as a keyword, the search results do not include this document.

The search query list 124a includes, for example, [F-SQLDB], [V6.0], [V7.0], ["Disk space shortage"], ["Wrong flag"], and so on. These are search queries each including one keyword. The search query list 124a also includes, for example, [F-SQLDB V6.0], [F-SQLDB V7.0], [F-SQLDB "Disk space shortage"], [F-SQLDB "Wrong flag"], [V6.0 V7.0], and so on. These are search queries each including two keywords.

On the other hand, the search query list 124b includes, for example, [software:F-SQLDB], [version:V6.0], [version:V7.0], [error:"Disk space shortage"], [error:"Wrong flag"], and so on. These are search queries each including one keyword. The search query list 124b also includes, for example, [software:F-SQLDB version:V6.0], [software:F-SQLDB version:V7.0], [software:F-SQLDB error:"Disk space shortage"], [software:F-SQLDB error:"Wrong flag"], [version:V6.0 version:V7.0], and so on. These are search queries each including two keywords.

Figure 8:
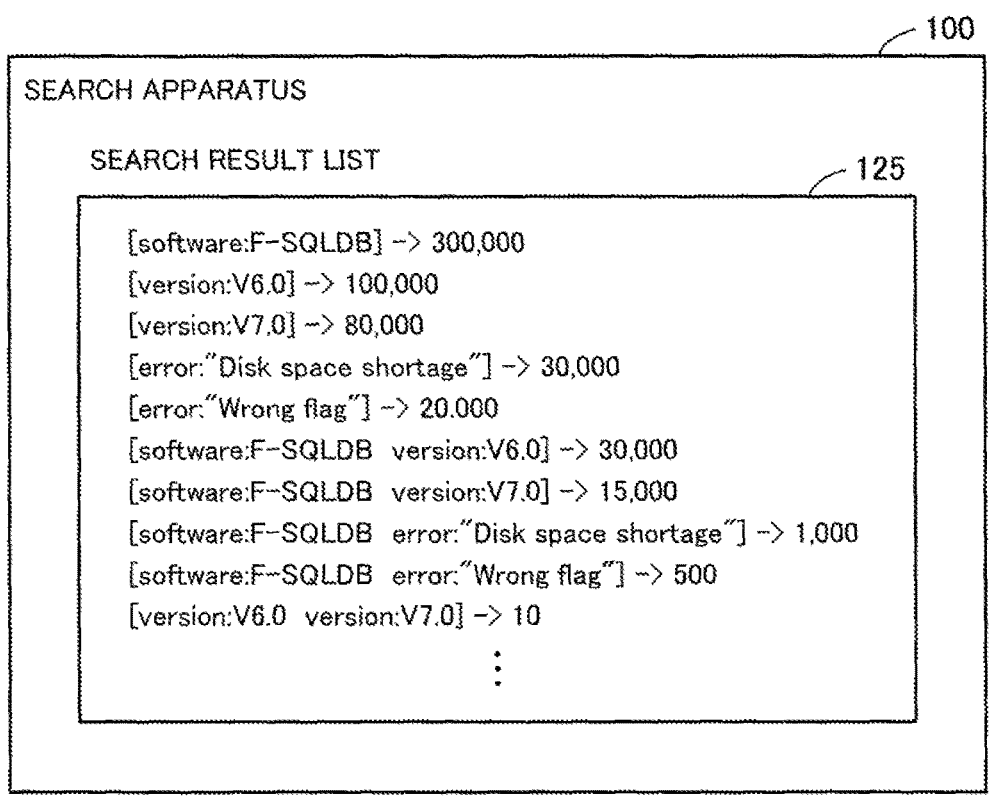
FIG. 8 illustrates an example of a search result list.

FIG. 8 illustrates an example of a search result list.

The search apparatus 100 executes one by one the search queries included in the search query list 124a or the search query list 124b, and calculates the number of documents matching each search query. The number of matching documents usually indicates how many documents contain all the keywords specified in the search query. Then, the search apparatus 100 generates a search result list 125. The search result list 125 is a list of pairs of a search query and a document count. Each line of the search result list 125 indicates one pair of a search query and a document count.

The search queries on the search result list 125 contain the item name even in the case where the search queries on the search query list 124a are executed. This is because the item name is referred to when calculating the evaluation value of the recommended item as will be described below. In the case of executing search queries on the search query list 124a, the search apparatus 100 adds the item name for each keyword based on the item value list 123.

For example, the search result list 125 includes the following information: [software:F-SQLDB]→300,000. This indicates that 300,000 documents are retrieved by a search query "F-SQLDB" or a search query "software:F-SQLDB". Further, for example, the search result list 125 includes the following information: [software:F-SQLDB version:V6.0]→30,000. This indicates that 30,000 documents are retrieved by a search query "F-SQLDB V6.0" or a search query "software:F-SQLDB version:V6.0".

Figure 9:
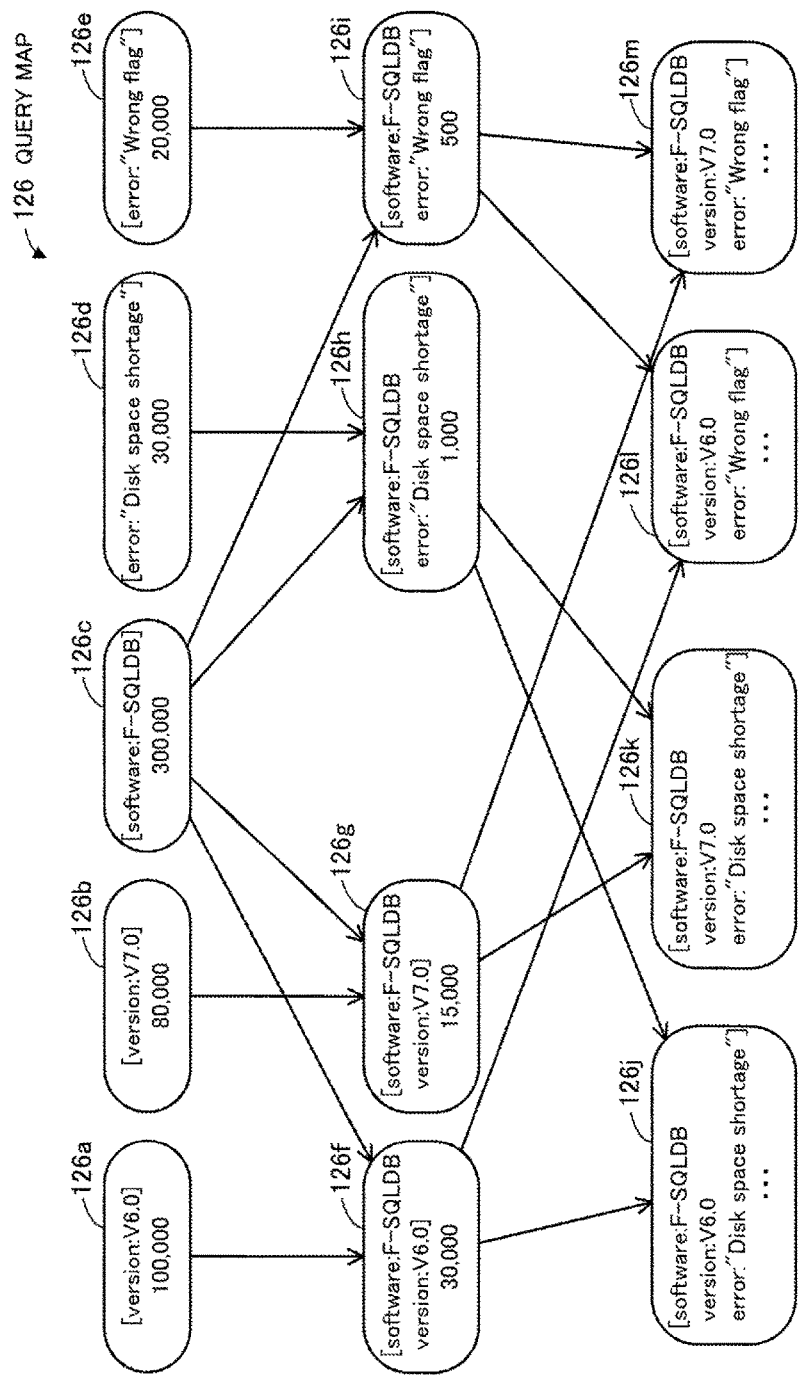
FIG. 9 illustrates an example of a query map.

FIG. 9 illustrates an example of a query map.

The search apparatus 100 generates a query map 126 based on the search result list 125. The query map 126 is a directed graph including a plurality of nodes and unidirectional links connecting the nodes. Each node corresponds to one line, that is, one pair of a search query and a document count in the search result list 125. Each link represents the inclusion relationship between search queries. If the difference in the number of keywords between one node and another node is 1 and the latter includes all the keywords contained in the former, a link directed from the former to the latter is generated.

For example, the query map 126 includes nodes 126a, 126b, 126c, 126d, 126e, 126f, 126g, 126h, 126i, 126j, 126k, 126l, and 126m. The node 126a indicates [version:V6.0] as a search query with the item name. The node 126b indicates [version:V7.0]. The node 126c indicates [software:F-SQLDB]. The node 126d indicates [error:"Disk space shortage"]. The node 126e indicates [error:"Wrong flag"].

The node 126f indicates [software:F-SQLDB version:V6.0]. The node 126g indicates [software:F-SQLDB version:V7.0]. The node 126h indicates [software:F-SQLDB error:"Disk space shortage"]. The node 126i indicates [software:F-SQLDB error:"Wrong flag"].

The node 126j indicates [software:F-SQLDB version:V6.0 error:"Disk space shortage"]. The node 126k indicates [software:F-SQLDB version:V7.0 error:"Disk space shortage"]. The node 126l indicates [software:F-SQLDB version:V6.0 error:"Wrong flag"]. The node 126m indicates [software:F-SQLDB version:V7.0 error:"Wrong flag"].

The search query of the node 126f includes all the keywords in the search query of the node 126a, and also includes one additional keyword. Accordingly, a link from the node 126a to the node 126f is generated. Similarly, a link from the node 126b to the node 126g, links from the node 126c to the nodes 126f, 126g, 126h, and 126i, a link from the node 126d to the node 126h, and a link from the node 126e to the node 126i are generated. Further, links from the node 126f to the nodes 126j and 126l, links from the node 126g to the nodes 126k and 126m, links from the node 126h to the nodes 126j and 126k, and links from the node 126i to the nodes 126l and 126m are generated.

FIG. 10 illustrates an example of a recommended item table.

The search apparatus 100 generates a recommended item table 127 based on the query map 126, and stores the recommended item table 127. Each line in the recommended item table 127 corresponds to one node in the query map 126. The recommended item table 127 includes the following fields: Search Query, Recommended Item, Evaluation 1, and Evaluation 2. The Search Query field stores the search query indicated in each node on the query map 126. The Recommended Item field stores the item name. The Evaluation 1 field stores a first evaluation value, and the Evaluation 2 field stores a second evaluation value. The search apparatus 100 calculates the first evaluation value and the second evaluation value in the manner described below.

The search apparatus 100 checks, for one node of the query map 126, the document count of the one node (source node) and the document count of each of nodes (target nodes) linked from the source node. The document count of the source node indicates the document count before refinement, and the document count of the target node indicates the document count after refinement by adding one keyword. The search apparatus 100 evaluates the refinement effect of each link, based on the document count of the source node and the document count of the target node.

The greater the reduction in document count resulting from adding one keyword is, the greater the value indicating the refinement effect becomes. For example, the value indicates the difference or the ratio between the document counts before and after refinement. The search apparatus 100 calculates, for each of items to which keywords to be added belong, the value indicating the refinement effect, and calculates the first evaluation value and the second evaluation value. The first evaluation value and the second evaluation value represent an evaluation of the entire item to which a keyword to be added belongs, instead of an evaluation of each keyword. The first evaluation value indicates the average of the values representing the refinement effects. The greater the first evaluation value is, the greater the refinement effect is. The second evaluation value indicates the degree of dispersion of the values representing the refinement effects. The smaller the second evaluation value is, the higher the reliability of the refinement effect is. The search apparatus 100 specifies each node included in the query map 126 as a source node and performs the processing described above.

For example, assume that the difference between the document counts before and after refinement is used as the value representing the refinement effect. The document count of the node 126c is 300,000. If "V6.0" belonging to "version" is added as a keyword, the document count is reduced to 30,000 as indicated in the node 126f. Thus, the refinement effect is 270,000. If "V7.0" belonging to "version" is added as a keyword, the document count is reduced to 15,000 as indicated in the node 126g. Thus, the refinement effect is 285,000.

Accordingly, the first evaluation value of "version" for the search query of the node 126c is (270,000+285,000)/2=277, 500. Further, the second evaluation value is calculated as, for example, $((277,500-270,000)^2+(277,500-285,000)^2)^{1/2}/2=5,303$. Note that the second evaluation value only needs to represent the degree of dispersion of the refinement effect, and therefore the dispersion, the standard deviation, and various other indices may be used as the second evaluation value.

Similarly, if "Disk space shortage" belonging to "error" is added as a keyword, the document count is reduced to 1,000 as indicated in the node 126h. Thus, the refinement effect is 299,000. If "Wrong flag" belonging to "error" is added as a keyword, the document count is reduced to 500 as indicated in the node 126i. Thus, the refinement effect is 299,500. Accordingly, the first evaluation value of "error" for the search query of the node 126c is (299,000+299,500)/2=299, 250. The second evaluation value is $((299,250-299,000)^2+(299,250-299,500)^2)^{1/2}/2=176.7$.

As another example, assume that the ratio between the document counts before and after refinement is used as the value representing the refinement effect. The document count of the node 126c is 300,000. If "V6.0" belonging to "version" is added as a keyword, the document count is reduced to 30,000. Thus, the refinement effect is 300,000/30,000=10. If "V7.0" belonging to "version" is added as a keyword, the document count is reduced to 15,000. Thus, the refinement effect is 300,000/15,000=20. Accordingly, the first evaluation value of "version" for the search query of the node 126c is (10+20)/2=15, and the second evaluation value is 3.5.

Similarly, if "Disk space shortage" belonging to "error" is added as a keyword, the document count is reduced to 1,000. Thus, the refinement effect is 300,000/1,000=300. If "Wrong flag" belonging to "error" is added as a keyword, the document count is reduced to 500. Thus, the refinement effect is 300,000/500=600. Accordingly, the first evaluation value of "error" for the search query of the node 126c is (300+600)/2=450, and the second evaluation value is 106.1.

Figure 11A:
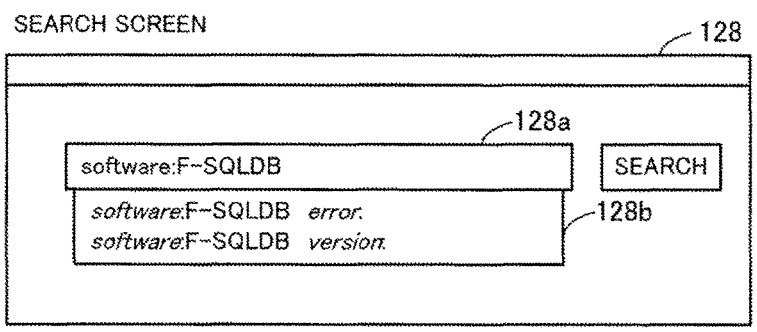
FIGS. 11A and 11B are diagrams each illustrating an example of a search screen.
Figure 11B:
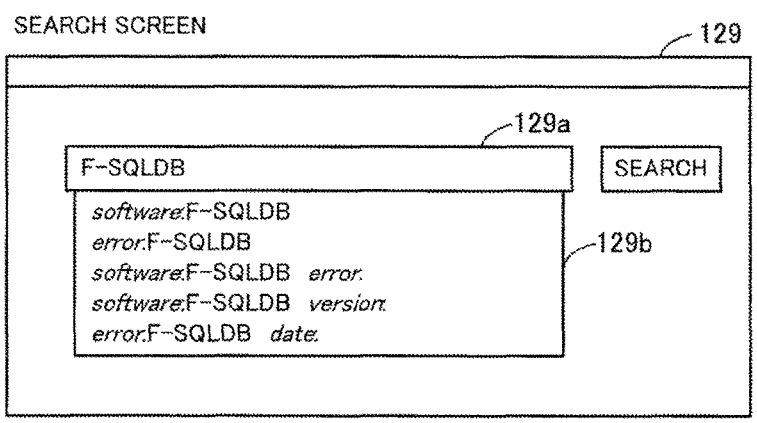

FIGS. 11A and 11B are diagrams each illustrating an example of a search screen.

When an operations manager enters a search query, the search apparatus 100 selects one or more recommended items based on the recommended item table 127, and transmits one or more messages each including the item name of one of the selected recommended items to the terminal apparatus 200. The terminal apparatus 200 displays the messages received from the search apparatus 100, together with the search query entered by the operations manager.

More specifically, the search apparatus 100 obtains, from the recommended item table 127, the recommended items, the first evaluation values, and the second evaluation values associated with the search query entered by the operations manager. First, the search apparatus 100 selects one or more recommended items based on the first evaluation values. For example, the search apparatus 100 selects a predetermined number of recommended items in descending order of the first evaluation value. Alternatively, for example, the search apparatus 100 selects recommended items having a first evaluation value equal to or greater than a predetermined threshold. Then, the search apparatus 100 determines the priority order of the selected recommended items, based on the second evaluation values. For example, the search apparatus 100 compares the second evaluation values of two or more recommended items having the same level of first evaluation value (for example, with a difference of less than a predetermined threshold), and sorts the two or more recommended items in ascending order of the second evaluation value.

The message displayed on the terminal apparatus 200 differs depending on whether the item to which the keyword belongs is specified by the operations manager. If the search query includes the item name, the search apparatus 100 searches the recommended item table 127 to find a recommended item corresponding to a pair of the item name and the keyword entered by the operations manager. Then, a message including the search query entered by the operations manager and the item name of the selected recommended item is displayed on the terminal apparatus 200.

On the other hand, if the search query does not include the item name, it is not known to which item the keyword entered by the operations manager belongs, and the keyword may match two or more items. Accordingly, the search apparatus 100 compares the keyword portion in the Search Query field of the recommended item table 127 with the keyword entered by the operations manager, and determines one or more items to which the entered keyword may belong. That is, the search apparatus 100 adds the item name to the search query. Then, the search apparatus 100 searches the recommended item table 127 to find a recommended item corresponding to the search query with the item name added. A message including the search query with the item name added is displayed on the terminal apparatus 200. Further, a message including the search query with the item name added and the item name of the selected recommended item is displayed on the terminal apparatus 200.

For example, a search screen 128 is displayed on the terminal apparatus 200. The search screen 128 includes an input field 128a and a message display area 128b. An entered search query "software:F-SQLDB" is displayed in the input field 128a. In this search query, the item to which the keyword belongs is specified.

Thus, one or more messages each including the search query and the item name of a recommended item are displayed in the message display area 128b. For example, a message "software:F-SQLDB error:" and a message "software:F-SQLDB version:" are displayed in the message display area 128b. These two messages indicate that the items "Error Log" and "Version" are the recommended items useful to refine the search results of the search query "software:F-SQLDB". Further, these messages indicate that "Error Log" has a higher priority than "Version" and is useful to refine the search results.

Further, as another example, a search screen 129 is displayed on the terminal apparatus 200. The search screen 129 includes an input field 129a and a message display area 129b. An entered search query "F-SQLDB" is displayed in the input field 129a. In this search query, the item to which the keyword belongs is not specified.

Thus, one or more messages each including the search query with the item name added are displayed in the message display area 129b. For example, a message "software:F-SQLDB" and a message "software:F-SQLDB version:" are displayed in the message display area 129b. These two messages indicate that there are a document in which "F-SQLDB" is included in the item "Software" and a document in which "F-SQLDB" is included in the item "Error Log".

Further, one or more messages each including the search query with the item name added and the item name of a recommended item are displayed in the message display area 129b. For example, a message "software:F-SQLDB error:" and a message "software:F-SQLDB version:" are displayed in the message display area 129b. These two messages indicate that, if the entered keyword is intended to belong to the item "Software", the items "Error Log" and "Version" are the recommended items useful to refine the search results. Further, these messages indicate that "Error Log" has a higher priority than "Version" and is useful to refine the search results. Further, for example, a message "software:F-SQLDB date:" is displayed in the message display area 129b. This message indicates that, if the entered keyword is intended to belong to the item "Error Log", the item "Date and Time of Occurrence" ("date") is the recommended item useful to refine the search results.

The following describes the functions of the search apparatus 100 and the terminal apparatus 200.

Figure 12:
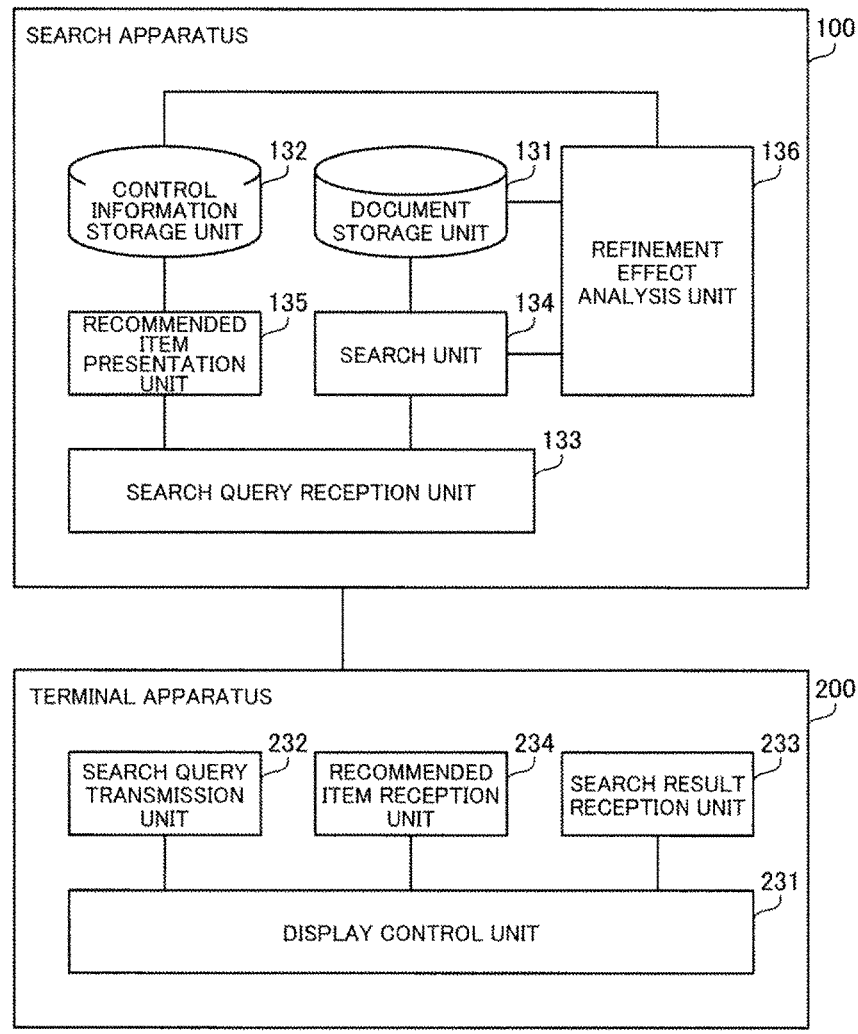
FIG. 12 is an exemplary functional block diagram of the search apparatus and the terminal apparatus.

FIG. 12 is an exemplary functional block diagram of the search apparatus 100 and the terminal apparatus 200.

The search apparatus 100 includes a document storage unit 131, a control information storage unit 132, a search query reception unit 133, a search unit 134, a recommended item presentation unit 135, and a refinement effect analysis unit 136. The document storage unit 131 and the control information storage unit 132 are implemented using a storage area reserved in the RAM 102 or the HDD 103, for example. The search query reception unit 133, the search unit 134, the recommended item presentation unit 135, and the refinement effect analysis unit 136 are implemented using program modules executed by the CPU 101, for example.

The document storage unit 131 stores a plurality of documents such as the documents 121a and 121b. Each document is an incident response report about one incident. The search apparatus 100 stores a document received from the terminal apparatus 200 in the document storage unit 131.

The control information storage unit 132 stores various types of control information used by the recommended item presentation unit 135 and the refinement effect analysis unit 136. More specifically, the control information storage unit 132 stores the extraction rule table 122, the item value list 123, the search query lists 124a and 124b, the search result list 125, the query map 126, and the recommended item table 127.

The extraction rule table 122 is created in advance by the operations manager or other managers and stored in the control information storage unit 132, before starting generation of the recommended item table 127. The item value list 123, the search query lists 124a and 124b, the search result list 125, and the query map 126 are generated by the refinement effect analysis unit 136. After completion of generation or update of the recommended item table 127, part or all of the item value list 123, the search query lists 124a and 124b, the search result list 125, and the query map 126 may be deleted. The recommended item table 127 is appropriately referred to in response to reception of a search query.

The search query reception unit 133 receives a search query from the terminal apparatus 200. The search query includes one or more keywords as a search condition. A search condition including two or more keywords indicates a search for the logical AND of the two or more keywords. In some cases, the keyword is accompanied by the item name of the item to which the keyword belongs. In other cases, the keyword is not accompanied by the item name. The search query reception unit 133 outputs the search query to the search unit 134 and the recommended item presentation unit 135.

Upon receiving the search query from the search query reception unit 133, the search unit 134 searches for documents matching the search query from the documents stored in the document storage unit 131. Usually, the search unit 134 searches for documents containing all the keywords specified in the search query from the document storage unit 131. If the item name is added to each keyword, the search unit 134 searches for documents containing each specified keyword as the value of the specified item.

The search unit 134 transmits the search results to the terminal apparatus 200. The search results indicate information on part or all of the retrieved documents, and the number of retrieved documents. The search results may include identification information of the retrieved documents or links to the retrieved documents. Further, the search results may include part or all of the content of the retrieved documents. The search unit 134 may receive a search query from the refinement effect analysis unit 136. In this case, the search unit 134 searches for documents matching the search query from the documents stored in the document storage unit 131. The search unit 134 reports the number of retrieved documents to the refinement effect analysis unit 136.

Upon receiving the search query from the search query reception unit 133, the recommended item presentation unit 135 refers to the recommended item table 127 stored in the control information storage unit 132, and selects one or more recommended items useful to refine the search results. If the item name is not added to any of the keywords, the recommended item presentation unit 135 first adds the item name based on the recommended item table 127. The recommended item presentation unit 135 obtains the recommended items and the evaluation values corresponding to the search query with the item name added, from the recommended item table 127. Then, the recommended item presentation unit 135 selects one or more recommended items to be presented based on the evaluation values. The recommended item presentation unit 135 generates a message including the search query with the item name added, and a message including the received search query or the search query with the item name added and the item name of the recommended item, and transmits the messages to the terminal apparatus 200.

The refinement effect analysis unit 136 analyzes the documents stored in the document storage unit 131, and generates or updates the recommended item table 127. The processing by the refinement effect analysis unit 136 may be performed in response to an instruction from the operations manager or other managers, or may be performed periodically.

The refinement effect analysis unit 136 extracts pairs of an item name and a value from the documents stored in the document storage unit 131, based on the extraction rule table 122 stored in the control information storage unit 132, and generates the item value list 123. The refinement effect analysis unit 136 uses the values of the items on the item value list 123 as keywords so as to generate search queries each including one or a combination of two or more keywords. Then, the refinement effect analysis unit 136 generates the search query list 124a or the search query list 124b.

The refinement effect analysis unit 136 outputs the search queries on the search query list 124a or 124b to the search unit 134, obtains information on the document count for each search query from the search unit 134, and generates the search result list 125. The refinement effect analysis unit 136 generates the query map 126 based on the search result list 125. Each node on the query map 126 indicates one search query and one document count. The refinement effect analysis unit 136 calculates the recommended item and the evaluation value for each search query, based on the connection relationship between the nodes on the query map 126 and the document count indicated by each node. Then, the refinement effect analysis unit 136 generates or updates the recommended item table 127.

The terminal apparatus 200 includes a display control unit 231, a search query transmission unit 232, a search result reception unit 233, and a recommended item reception unit 234. The display control unit 231, the search query transmission unit 232, the search result reception unit 233, and the recommended item reception unit 234 are implemented using program modules executed by the CPU of the terminal apparatus 200, for example.

The display control unit 231 causes the display of the terminal apparatus 200 to display various types of screens such as the search screens 128 and 129 and the like. A search query entered by the operations manager, the search results received from the search apparatus 100, the messages received from the search apparatus 100, and so on are displayed on the screen.

The search query transmission unit 232 transmits a search query entered by the operations manager to the search apparatus 100. The search query is entered in a predetermined input field on the search screen. The search result reception unit 233 receives the search results from the search apparatus 100 as a response to the search query. Then, the search result reception unit 233 outputs the search results to the display control unit 231. Thus, the search results are displayed on the screen. The recommended item reception unit 234 receives a message about the recommended item as a response from the search query from the search apparatus 100. Then, the recommended item reception unit 234 outputs the message to the display control unit 231. Thus, message about the recommended item is displayed on the screen, such as the search screens 128 and 129 and the like.

Note that when a search query is transmitted from the terminal apparatus 200 to the search apparatus 100, both the search results and the message indicating the recommended item may be transmitted from the search apparatus 100 to the terminal apparatus 200. In this case, the search results and the message indicating the recommended item may be transmitted together to the terminal apparatus 200, or may be transmitted separately to the terminal apparatus 200. In the latter case, either of the search results and the message of the recommended item may be transmitted first.

Further, before the operations manager issues a search instruction on the search screen, a search query may be transmitted from the terminal apparatus 200 to the search apparatus 100 while the search query is being entered, and only a message indicating a recommended item may be transmitted from the search apparatus 100 to the terminal apparatus 200. In this case, when the operations manager issues a search instruction on the search screen, the search query completed to be entered is transmitted from the terminal apparatus 200 to the search apparatus 100, and only the search results are transmitted from the search apparatus 100 to the terminal apparatus 200.

For example, pressing a search button corresponds to issuing a search instruction. When transmitting a search query, the search query transmission unit 232 of the terminal apparatus 200 may transmit information indicating whether the search button is pressed, together with the search query. If the search button is not pressed, the search query reception unit 133 of the search apparatus 100 outputs the search query to the recommended item presentation unit 135. If the search button is pressed, the search query reception unit 133 outputs a search query to the search unit 134.

The following describes a processing procedure performed by the search apparatus 100.

Figure 13:
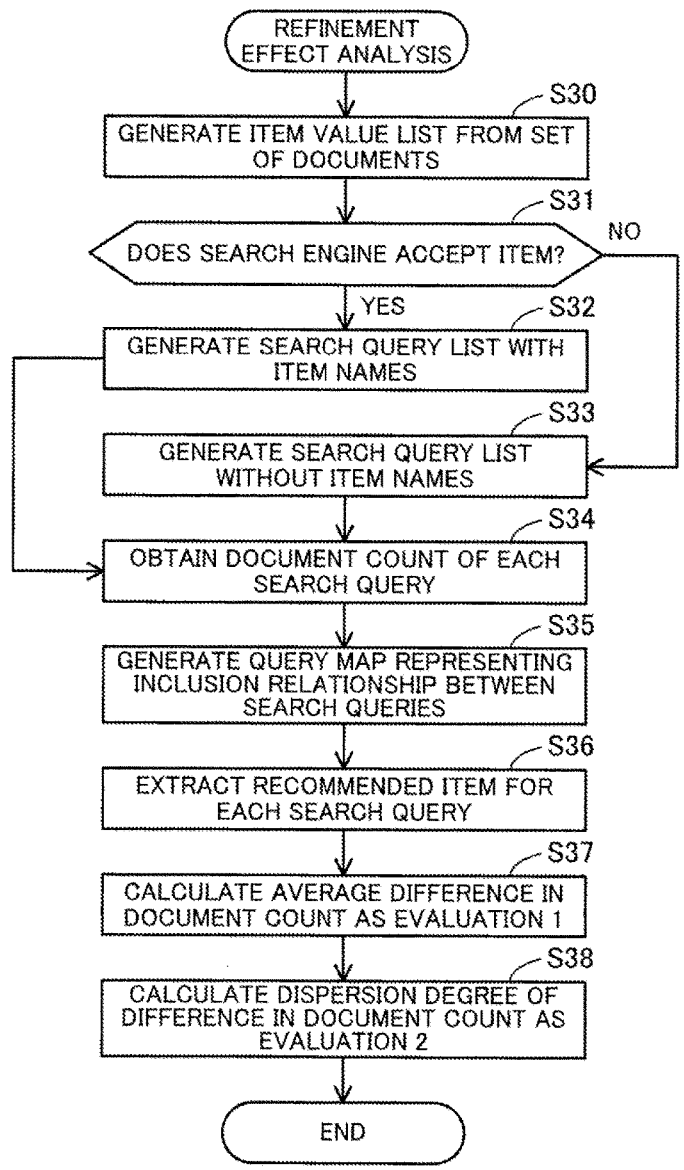
FIG. 13 is a flowchart illustrating an example of the procedure of refinement effect analysis.

FIG. 13 is a flowchart illustrating an example of the procedure of refinement effect analysis.

(S30) The refinement effect analysis unit 136 extracts pairs of an item and its value from the set of documents stored in the document storage unit 131, based on the extraction rule table 122. The refinement effect analysis unit 136 generates an item value list 123 including all the extracted pairs of an item and its value.

(S31) The refinement effect analysis unit 136 determines whether the search engine used by the search unit 134 accepts a search query specifying an item to which a keyword belongs. If a search query with an item specified is accepted, the process proceeds to step S32. If a search query with an item specified is not accepted, the process proceeds to step S33.

(S32) The refinement effect analysis unit 136 generates a search query using a value of an item on the item value list 123 as a keyword. The refinement effect analysis unit 136 repeatedly selects one or more keywords from the item value list 123 so as to generate search queries for all the possible choices of keywords. In this step, the refinement effect analysis unit 136 adds an item name to each keyword, based on the item value list 123. The refinement effect analysis unit 136 generates a search query list 124b that lists search queries with the item names added. Then, the process proceeds to step S34.

(S33) The refinement effect analysis unit 136 generates a search query using a value of an item on the item value list 123 as a keyword. The refinement effect analysis unit 136 repeatedly selects one or more keywords from the item value list 123 so as to generate search queries for all the possible choices of keywords. In this step, it is not needed to add an item name to each keyword. The refinement effect analysis unit 136 generates a search query list 124*a* that lists search queries without item names.

(S34) The refinement effect analysis unit 136 obtains search queries one by one from the search query list 124*b* generated in step S32 or the search query list 124*a* generated in step S33, and outputs the search queries to the search unit 134. The refinement effect analysis unit 136 obtains the count of documents matching each search query from the search unit 134, and generates a search result list 125 in which each search query is associated with the document count. An item name is added to each search query on the search result list 125.

(S35) The refinement effect analysis unit 136 generates a query map 126 based on the search result list 125. Each node on the query map 126 corresponds to one line, that is, one pair of a search query and a document count in the search result list 125. Each link on the query map 126 represents the inclusion relationship between search queries. If there is a search query having one additional keyword with respect to a certain search query, a link from a node corresponding to the certain search query to a node corresponding to the search query having one additional keyword is generated.

(S36) The refinement effect analysis unit 136 extracts one or more recommended items for each search query, based on the query map 126. More specifically, the refinement effect analysis unit 136 selects one node (source node) from the query map 126, and finds another node (target node) linked from the source node. The refinement effect analysis unit 136 compares a search query of the source node and a search query of the target node, and extracts an item to which an additional keyword belongs as a recommended item.

(S37) The refinement effect analysis unit 136 calculates an evaluation value of "Evaluation 1" for each pair of a search query and a recommended item, based on the query map 126. More specifically, the refinement effect analysis unit 136 calculates the difference between the document count of the source node and the document count of the target node. The refinement effect analysis unit 136 calculates, for the target nodes having the same recommended item (having additional keywords belonging to the same item), the average of the difference in document count, and thereby obtains an evaluation value of "Evaluation 1". Note that, as mentioned above, the ratio of the document count may be used in place of the difference in document count.

(S38) The refinement effect analysis unit 136 calculates an evaluation value of "Evaluation 2" for each pair of a search query and a recommended item, based on the query map 126. More specifically, the refinement effect analysis unit 136 calculates, for the target nodes having the same recommended item (having additional keywords belonging to the same item), the degree of dispersion of the difference in document count in accordance with a predetermined formula, and thereby obtains an evaluation value of "Evaluation 2". Note that, as mentioned above, the ratio of the document count may be used in place of the difference in document count. Then, the refinement effect analysis unit 136 generates or updates the recommended item table 127.

Figure 14:
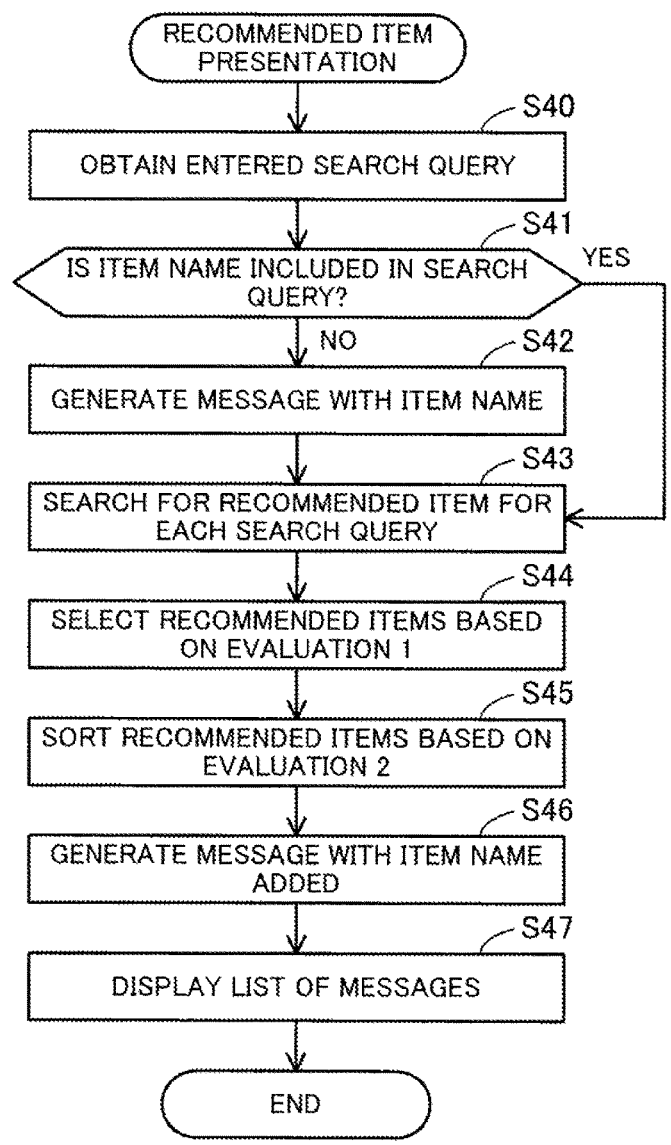
FIG. 14 is a flowchart illustrating an example of the procedure of recommended item presentation.

FIG. 14 is a flowchart illustrating an example of the procedure of recommended item presentation.

(S40) The recommended item presentation unit 135 obtains an entered search query.

(S41) The recommended item presentation unit 135 determines whether the obtained search query includes an item name associated with a keyword. If an item name is included, the process proceeds to step S43. If an item name is not included, the process proceeds to step S42.

(S42) The recommended item presentation unit 135 adds an item name to the obtained search query, based on the recommended item table 127. More specifically, the recommended item presentation unit 135 compares the Search Query field of the recommended item table 127 with the keyword specified in the obtained search query, and determines one or more items to which the specified keyword may belong. In some cases, two or more search queries with the item names added are generated. Then, the recommended item presentation unit 135 generates one or more messages each indicating a search query with the item name added.

(S43) For each of the obtained search queries or the search queries with the item names added, the recommended item presentation unit 135 searches the recommended item table 127 to find a recommended item for the search query. Two or more recommended items may be found for one search query.

(S44) For each of the obtained search queries or the search queries with the item names added, the recommended item presentation unit 135 selects one or more recommended items, based on the evaluation values of "Evaluation 1" registered in the recommended item table 127. For example, the recommended item presentation unit 135 selects a predetermined number of recommended items in descending order of the evaluation value of "Evaluation 1". Alternatively, for example, the recommended item presentation unit 135 selects recommended items whose evaluation value of "Evaluation 1" is equal to or greater than a predetermined threshold.

(S45) For each of the obtained search queries or the search queries with the item names added, the recommended item presentation unit 135 sorts the recommended items selected in step S44, based on the evaluation values of "Evaluation 2" registered in the recommended item table 127. For example, the recommended item presentation unit 135 basically sorts the recommended items in descending order of the evaluation value of "Evaluation 1". As for two or more recommended items having the same level of evaluation value of "Evaluation 1" (for example, the difference is less than a predetermined threshold), the recommended item presentation unit 135 sorts the recommended items in ascending order of the evaluation value of "Evaluation 2". Note that a recommended item whose evaluation value of "Evaluation 2" is equal to or greater than a predetermined threshold has a low reliability in refinement effect and therefore may be excluded. Alternatively, the recommended item presentation unit 135 may sort the recommended items in ascending order of the evaluation value of "Evaluation 2", without using the evaluation values of "Evaluation 1".

(S46) The recommended item presentation unit 135 generates a message including the obtained search query or the search query with the item name added, and the item name of the recommended item selected in step S44. In some cases, two or more messages are generated. In the case where two or more messages are generated, the messages are arranged in the order corresponding to the results of sorting of step S45.

(S47) The recommended item presentation unit 135 transmits a list of messages generated in step S42 and step S46 to the terminal apparatus 200. The messages generated in step S42 have higher priority than the message generated in step S46. The recommended item reception unit 234 of the terminal apparatus 200 receives the list of the messages from the search apparatus 100. The display control unit 231 causes the display to display the received list of messages.

For example, the display control unit 231 causes the display to display a list of messages immediately under the input field.

According to the information processing system of the second embodiment, when a certain search query is entered, a recommended item likely to be useful to refine the search results obtained from the search query is presented. The recommended item is selected based on the average refinement effect of each set of additional keywords belonging to the same item, instead of the refinement effect of each additional keyword. Accordingly, even in the case where a specific keyword to be entered is not known unless the operations manager performs additional work, since the work related to a recommended item is preferentially performed, it becomes more likely that a keyword with a high refinement effect is obtained. Therefore, it is possible to reduce the risk of the work performed by the operations manager coming to nothing, and thus to reduce the work needed to sufficiently refine the search results. Further, since the evaluation value representing the dispersion of the refinement effect is used, it is possible to objectively evaluate the risk that a keyword obtained by work does not have a desired refinement effect.

As mentioned above, the information processing in the first embodiment may be implemented by causing the search apparatus 10 to execute a program. The information processing of the second embodiment may be realized by causing the search apparatus 100 and the terminal apparatus 200 to execute a program.

Each program may be recorded in a computer-readable storage medium (for example, the storage medium 113). Examples of storage media include magnetic disks, optical discs, magneto-optical disks, semiconductor memories, and the like. Examples of magnetic disks include FD and HDD. Examples of optical discs include CD, CD-Recordable (CD-R), CD-Rewritable (CD-RW), DVD, DVD-R, and DVD-RW. The program may be stored in a portable storage medium and distributed. In this case, the program may be executed after being copied from the portable storage medium to another storage medium (for example, the HDD 103).

According to one aspect, even when the user needs to perform work upon adding a search condition, the efficiency of refining the search results is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
generating an item value list from stored documents, the item value list enumerating keywords each in combination with an item name representing a specific item to which a plurality of keywords belong;
calculating a first document count indicating a number of documents that are retrieved based on a first keyword, a second document count indicating a number of documents that are retrieved based on a logical AND of the first keyword and a second keyword indicated by the item value list as belonging to one item of a plurality of items, and a third document count indicating a number of documents that are retrieved based on a logical AND of the first keyword and a third keyword indicated by the item value list as belonging to the one item, among a set of documents stored in a storage device;
calculating an evaluation value of the one item, based on the first document count, the second document count, and the third document count; and
when the evaluation value satisfies a predetermined condition, outputting recommendation information recommending use of the one item of the plurality of items to narrow down documents that are retrieved.

2. The non-transitory computer-readable storage medium according to claim 1, wherein the evaluation value is calculated based on a difference or a ratio between the first document count and the second document count, and a difference or a ratio between the first document count and the third document count.

3. The non-transitory computer-readable storage medium according to claim 1, wherein:
the process further includes
calculating a fourth document count indicating a number of documents that are retrieved based on a logical AND of the first keyword and a fourth keyword belonging to another item of the plurality of items, and a fifth document count indicating a number of documents that are retrieved based on a logical AND of the first keyword and a fifth keyword belonging to the other item, and
calculating an evaluation value of the other item, based on the first document count, the fourth document count, and the fifth document count; and
a determination of whether the evaluation value satisfies the predetermined condition includes comparing the evaluation value and the other evaluation value.

4. The non-transitory computer-readable storage medium according to claim 1, wherein:
the evaluation value is associated with the first keyword; and
the recommendation information is output after receiving a search request including the first keyword.

5. A search apparatus comprising:
a memory configured to store a set of documents; and
a processor configured to perform a process including:
generating an item value list from stored documents, the item value list enumerating keywords each in combination with an item name representing a specific item to which a plurality of keywords belong;
calculating a first document count indicating a number of documents that are retrieved based on a first keyword, a second document count indicating a number of documents that are retrieved based on a logical AND of the first keyword and a second keyword indicated by the item value list as belonging to one item of a plurality of items, and a third document count indicating a number of documents that are retrieved based on a logical AND of the first keyword and a third keyword indicated by the item value list as belonging to the one item, from the set of documents,
calculating an evaluation value of the one item, based on the first document count, the second document count, and the third document count, and
when the evaluation value satisfies a predetermined condition, outputting recommendation information recommending use of the one item of the plurality of items to narrow down documents that are retrieved.

6. A search method comprising:

generating, by a processor, an item value list from stored documents, the item value list enumerating keywords each in combination with an item name representing a specific item to which a plurality of keywords belong;

calculating, by the processor, a first document count indicating a number of documents that are retrieved based on a first keyword, a second document count indicating a number of documents that are retrieved based on a logical AND of the first keyword and a second keyword indicated by the item value list as belonging to one item of a plurality of items, and a third document count indicating a number of documents that are retrieved based on a logical AND of the first keyword and a third keyword indicated by the item value list as belonging to the one item, among a set of documents stored in a storage device;

calculating, by the processor, an evaluation value of the one item, based on the first document count, the second document count, and the third document count; and when the evaluation value satisfies a predetermined condition, outputting, by the processor, recommendation information recommending use of the one item of the plurality of items to narrow down documents that are retrieved.

* * * * *